(12) United States Patent
Arie et al.

(10) Patent No.: US 8,531,438 B2
(45) Date of Patent: Sep. 10, 2013

(54) INFORMATION PROVIDING APPARATUS

(75) Inventors: Takumi Arie, Kanagawa (JP); Hideyuki Uemura, Kanagawa (JP); Shinichi Hasegawa, Kanagawa (JP); Hiroshi Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 10/580,488

(22) PCT Filed: Nov. 5, 2004

(86) PCT No.: PCT/JP2004/016802
§ 371 (c)(1),
(2), (4) Date: Mar. 27, 2007

(87) PCT Pub. No.: WO2005/052514
PCT Pub. Date: Jun. 9, 2005

(65) Prior Publication Data
US 2007/0172218 A1   Jul. 26, 2007

(30) Foreign Application Priority Data
Nov. 28, 2003 (JP) ................................. 2003-398410

(51) Int. Cl.
*G06F 3/038* (2013.01)
(52) U.S. Cl.
USPC ............... 345/204; 345/173; 345/211; 701/1; 701/400
(58) Field of Classification Search
USPC ........ 345/204–214, 30, 55, 173; 342/357.06; 701/213, 1, 400–467
See application file for complete search history.

(56) References Cited

U.S. PATENT DOCUMENTS

| 6,275,231 | B1 * | 8/2001 | Obradovich | 345/156 |
|---|---|---|---|---|
| 6,785,567 | B2 * | 8/2004 | Kato | 455/575.9 |
| 7,489,303 | B1 * | 2/2009 | Pryor | 345/173 |
| 2004/0243307 | A1 * | 12/2004 | Geelen | 701/213 |

FOREIGN PATENT DOCUMENTS

| EP | 1207072 A1 | * | 5/2002 |
|---|---|---|---|
| JP | 04-240687 A | | 8/1992 |
| JP | 06083296 A | * | 3/1994 |
| JP | 06-307879 | | 11/1994 |
| JP | 6-307879 | | 11/1994 |
| JP | 2000-329566 A | | 11/2000 |
| JP | 2001-13945 A | | 1/2001 |

(Continued)

Primary Examiner — Christopher E Leiby
(74) Attorney, Agent, or Firm — Wolf, Greenfield & Sacks, P.C.

(57) ABSTRACT

An information providing apparatus allowing appropriate confirmation of contents of information which assists travel of a mobile object, presented by an image display section, even when the image display section providing information which assists travel of the mobile object as an image display is placed under a condition producing vibration not smaller than a predetermined level. The equipment has an image display section (22) mounted in a vehicle and allowing image display of information which assists travel of the vehicle, a vibration sensor (44) detecting vibration not smaller than a predetermined level produced on the image display section (22) and sending a detection output signal, and an operation control section (30) modifying a display mode of information presented as an image display by the image display section (22), into the one having contents of the information are more readily recognizable, when the detection output signal from the vibration sensor (44) expresses that the image display section (22) is in a vibration-sustained state in which vibration not smaller than a predetermined level is sustained over a duration of time not shorter than a predetermined duration.

13 Claims, 4 Drawing Sheets

(56) References Cited

FOREIGN PATENT DOCUMENTS

| | | |
|---|---|---|
| JP | 2001-013945 A | 1/2001 |
| JP | 2003-169125 A | 6/2003 |
| WO | 2005/052514 A1 | 6/2005 |

\* cited by examiner

INFORMATION PROVIDING APPARATUS

FIELD OF THE INVENTION

The present invention relates to an information providing apparatus providing information which assists travel of a mobile object, using image display means mounted on the mobile object.

DESCRIPTION OF RELATED ART

As for mobile objects such as vehicle, marine vessels and the like, there are known techniques of providing information which assists travel thereof, using a navigation system equipped with an image display section. For example, in a vehicle having such navigation system adopted thereto, an image display section is disposed at a position in a cabin-forming portion from which a driver and fellow passengers (crews) in the vehicle can readily view images displayed thereon. For example, information regarding a road map in a predetermined region including a travel range of the vehicle is displayed as a road map image by the image display section, together with an image expressing a position and so forth of the vehicle as being superposed on the road map image, to thereby provide information which assists the road travel of the passengers of the vehicle.

In this sort of in-vehicle navigation system containing the image display section providing information which assists its on-road travel on the basis of image display, a problem has raised in that vibration produced typically with travel of the vehicle exerts adverse effects on the image displayed by the image display section. The adverse effects include that the image displayed by the image display section becomes less clearly visible for the crews observing it, and that the image is causative of a sense of fatigue for the crews observing it. In relation to this problem, there has conventionally been proposed an information display device which is used under an environment exerting vibration, given with vibration-proof measures (see, Japanese Patent Application Publication "KOKAI" No. Hei 7-261720, for example).

The image display device already proposed as described in the above is equipped with a display section allowing thereon image display of information, a vibration information preparing section sensing vibration received by the information display device and generating vibration information, and a display screen control section controlling a display screen in the display section in response to the vibration information obtained from the vibration information preparing section. The control by the display screen control section, with respect to the display screen in the display section, corresponded to the vibration information obtained from the vibration information preparing section reportedly includes: control for avoiding changes in relative position between an image on the display screen and an observer; control for producing graduation based on color mixing in the image on the display screen; control for shrinking a display range of the image on the display screen so as to decrease the information volume, and thereby displaying thus-shrunk display range in an enlarged manner; control for excluding a portion of less importance from the image on the display screen so as to decrease the information volume, and thereby displaying a simplified image; and control for allowing the image on the display screen, when formed typically on a front wind shield of the vehicle, to move together with a background, and reportedly aimed at preventing the image obtained on the display screen from becoming less comfortably viewable by the observer, and from becoming more likely to cause sense of fatigue of the observer.

Each of the several types of control, executed in the above-described information display devices ever proposed, in response to the vibration information with respect to the display screen in the display section, however, suffered from the problems below.

The control for avoiding changes in relative position between the image on the display screen and the observer raises a large difficulty, for the case where the display section on which the image screen is formed is mounted in a vehicle, and where the observer is a passenger of the vehicle, in controlling the image on the display screen so as to avoid changes in the position thereof relative to the observer, or the passenger, because when the display section is applied with vibration, also the passenger is separately applied with vibration. The control for producing graduation based on color mixing in the image on the display screen may make the image on the display screen extremely unclear, and may result in further worsened viewability for the observer. The control for shrinking a display range of the image on the display screen so as to decrease the information volume, and thereby displaying thus-shrunk display range in an enlarged manner, or the control for excluding a portion of less importance from the image on the display screen so as to decrease the information volume, and thereby displaying a simplified image may result in an insufficient volume of information to be presented as image display, and may raise feel of inconvenience or discontent of the observer. The control for allowing the image on the display screen, when formed typically on a front wind shield of the vehicle, to move together with a background supposedly raises an extreme difficulty in practice in keeping position of the display screen relative to the outer scene always constant, and the above-described Japanese Patent Application Publication "KOKAI" No. Hei 7-261720 gives no description at all on a measure for realizing the control.

Taking such situation into account, in provision of information by using image display, which assists travel of a mobile object, such as on-road driving of a vehicle, using an image display section mounted on a mobile object such as a vehicle, there is a demand for an appropriate information providing apparatus, not causative of the above-described problems, as a countermeasure for adverse effects of vibration generated with travel of the mobile object and exerted on the image displayed on the image display section, whereas no information providing apparatus, appropriately adapted to the demand, has been found until today.

Considering the above-described situation, the present invention is to provide an information providing apparatus having image display means mounted on a mobile object such as a vehicle, and presenting an image display of information which assists travel of the mobile object, allowing exact recognition of contents of the information which assist travel of a mobile object presented as an image display on image display means, even when the image display means is placed under vibration of not smaller than a predetermined level.

DISCLOSURE OF THE INVENTION

An information providing apparatus of the present invention is configured as having image display means mounted on a mobile object, presenting an image display of information which assists travel of the mobile object; vibration detecting means detecting vibration of not smaller than a predetermined level produced on the image display means, and sending a detection output signal; and operation control means modifying a display mode of the information presented as an image display by the image display means, when vibration not smaller than a predetermined level produced on the image display means sustains over a duration of time not shorter than a predetermined duration, and when output of the detection output signal from the vibration detecting means sustains over a duration of time not shorter than a predetermined duration.

When output of the detection output signal from the vibration detecting means sustains over a duration of time not shorter than a predetermined duration under such circumstance, the operation control means is typically configured as such taking part in a control of increasing luminance of a display screen on which the information is presented as an image display in the image display means; as such taking part in a control of enlarging images corresponded to mark information and character information out of the information presented as an image display by the image display means; and as such taking part in a control of increasing difference in contrast between an image of high importance and an image of low importance out of the information presented as an image display by the image display means.

According to the information providing apparatus of the present invention, when the image display means is placed under a vibration-sustained state in which vibration not smaller than a predetermined level is sustained over a duration of time not shorter than a predetermined duration, a control takes place so as to make contents of information more readily recognizable by allowing the operation control means to modify a display mode of the information presented as an image display by the image display means, typically by increasing luminance of a display screen on which the information in the image display means is presented as an image display. As a consequence, the contents of information which assist travel of a mobile object presented as the image display by the image display means will be more exactly recognizable, even when the image display means is placed under a vibration-sustained state.

BEST MODES FOR CARRYING OUT THE INVENTION

Best modes for carrying out the present invention will be explained referring to embodiments as described below.

Embodiments

Figure 1:
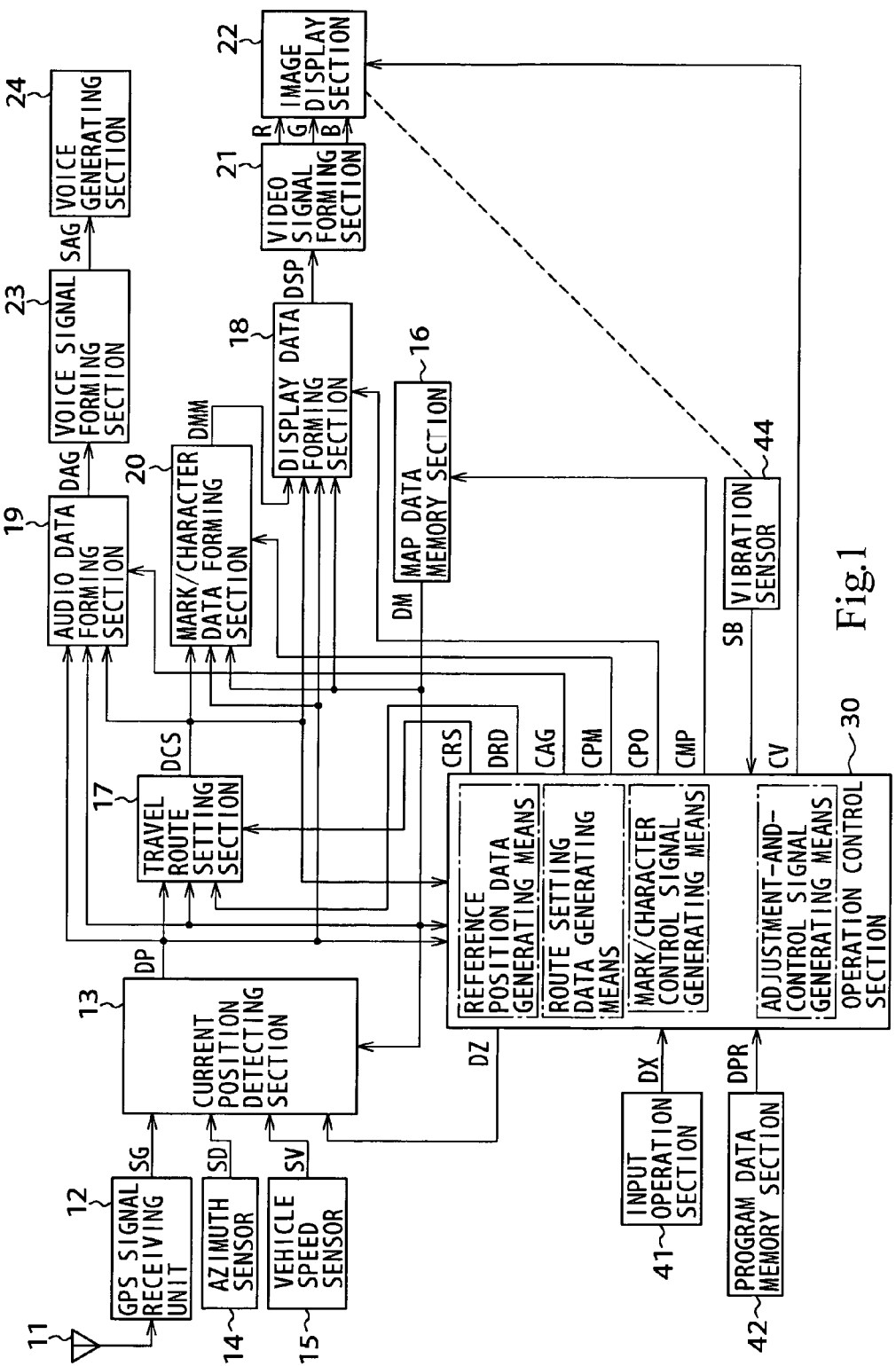
FIG. 1 is a block diagram showing an exemplary navigation system applied with one example of the information providing apparatus of the present invention.

FIG. 1 shows an exemplary navigation system applied with one example of the information providing apparatus of the present invention, wherein the navigation system herein allows the entire portion thereof to be mounted on a vehicle.

In the navigation system shown in FIG. 1, GPS signals from an artificial satellite in a global positioning system (GPS), that is, a radio navigation system using an artificial satellite are selectively received and subjected to a predetermined processing by a GPS signal antenna 11 and a GPS signal receiving section 12, and the GPS signal SG obtained therefrom after being processed by the predetermined processing is sent to a current position detecting section 13. The current position detecting section 13 is supplied with, in addition to the GPS signal SG from the GPS signal receiving section 12, a detection output SD from an azimuth sensor 14 detecting direction of travel of a vehicle having the navigation system shown in FIG. 1 mounted thereon (referred to as "equipped vehicle", hereinafter); a detection output SV from a vehicle speed sensor 15 detecting speed of travel of the equipped vehicle, that is, vehicle speed; and reference position data DZ expressing a reference position of the vehicle, supplied from an operation control section 30.

Map data DM read out from a map data memory section 16 which stores map data relating to a road network map in a range of travel of the equipped vehicle is also supplied to the current position detecting section 13. Reading-out of the map data DM from the map data memory section 16 is carried out corresponding to a memory control signal CMP supplied from the operation control section 30 to the map data memory section 16.

The current position detecting section 13 detects a current position of the equipped vehicle as a position on a road map expressed by the map data DM, based on the GPS signal SG from the GPS signal receiving section 12, the detection output SD from the azimuth sensor 14, the detection output SV from the vehicle speed sensor 15, the reference position data DZ from the reference position data generating unit in the operation control section 30, and the map data DM from the map data memory section 16, and sends out detected current position data DP expressing the current position. The current position data DP obtained from the current position detecting section 13 is then supplied to a travel route setting section 17, a display data forming section 18, a voice data forming section 19, a mark/character data forming section 20, and the operation control section 30.

The travel route setting section 17 is supplied, in addition to the current position data DP, also with the map data DM from the map data memory section 16, and route setting data DRD from the operation control section 30, including a destination data expressing a destination to be reached by the equipped vehicle and route searching conditions, and is supplied still also with an operation control signal CRS from the operation control section 30. The travel route setting section 17 typically assumes, corresponding to the operation control signal CRS, a position expressed by the current position data DP upon being supplied with the destination data, that is, a position of the equipped vehicle expressed by the reference position data DZ when the travel route setting section 17 is supplied with the destination data, as a start point on the road map expressed by the map data DM, and sets a route according to the route setting data DRD from the start point to the destination expressed by the destination data on the road map expressed by the map data DM, as a travel route along which the equipped vehicle should travel. The travel route setting section 17 then sends the set route data DCS expressing the set travel route, respectively to the display data forming section 18, the voice data forming section 19, the mark/character data forming section 20 and the operation control section 30.

The mark/character data forming section 20 is supplied with the current position data DP from the current position detecting section 13, the map data DM from the map data memory section 16, and the set route data DCS from the travel route setting section 17, and also supplied with a mark/character control signal CPM from a mark/character control signal generating unit in the operation control section 30, and supplies an own vehicle position mark indicating a current position of the equipped vehicle, and a mark/character data DMM expressing characters which indicate names given to various buildings, facilities and so forth, and names of places which appear along the individual roads on the road map within a range of travel of the equipped vehicle contained in the map data DM, to the display data forming section 18, under control by the mark/character control signal CPM, in accordance with the current position data DP, the map data DM and the set route data DCS.

The display data forming section 18 is also supplied with the map data DM from the map data memory section 16, the mark/character data DMM from the mark/character data forming section 20, and also with an operation control signal CPO set out from the operation control section 30, in addition to the current position data DP from the current position detecting section 13 and the set route data DCS from the travel route setting section 17.

In the display data forming section 18 under such circumstances, and under control of the operation control signal CPO, those selected from the current position data DP, the set route data DCS, the mark/character data DMM and the map data DM are appropriately synthesized, followed by formation of the image display data DSP which generally expresses a road map expressed by the map data DM, a current position of the equipped vehicle expressed by the current position data DP superposed on the road map, a set route expressed by the set route data DCS, and marks and characters expressed by the mark/character data DMM. The image display data DSP obtained from the display data forming section 18 is supplied to the video signal forming section 21.

Figure 2:
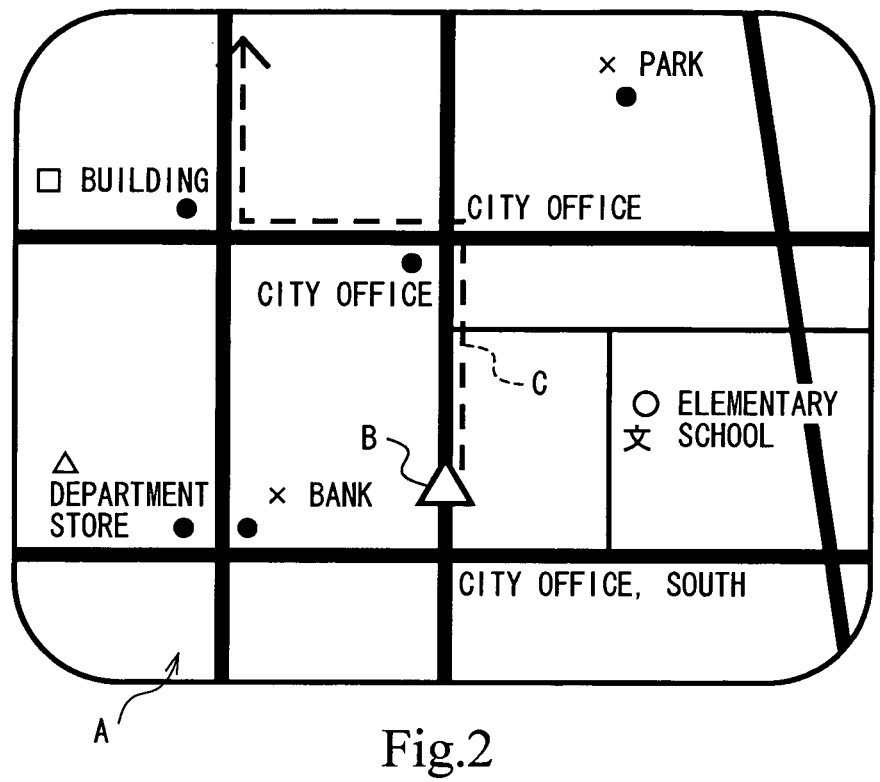
FIG. 2 is a conceptual drawing presented for explaining a display mode in an image display section used in the example shown in FIG. 1.

In the video signal forming section 21, a color video signal composed of a red primary color signal R, a green primary color signal G and a blue primary color signal B is formed, on the basis of the image display data DSP, and the color video signal is supplied to the image display section 22. The image display section 22 is supplied with an adjustment-and-control signal CV from an adjustment-and-control signal generating unit in the operation control section 30, and the image display section 22 forms, under control of the adjustment-and-control signal CV, the image screen on which an image based on the image display data DSP formed by the display data forming section 18 is formed. Then typically as shown in FIG. 2, on the screen formed by the image display section 22, a road map image A expressing a road map, an image B of own vehicle position mark superposed thereon, expressing a current position of the equipped vehicle, an image C expressing a set route, and images of characters indicating names given to various buildings, facilities and so forth, and names of places which appear along the individual roads shown in the map image A are displayed, as the information which assists travel of the equipped vehicle in a normal travel state such that the equipped vehicle produces vibration typically in its own body, and consequently in the image display section 22, to a level smaller than a predetermined level.

The voice data forming section 19 is supplied with the current position data DP from the current position detecting section 13 and the set route data DCS from the travel route setting section 17, also with the map data DM from the map data memory section 16, and still also with an operation control signal CAG from the operation control section 30. Under such circumstance, in response to the operation control signal CAG, and on the basis of the current position data DP, the set route data DCS and the map data DM, the voice data forming section 19 creates a state of forming a voice navigation data DAG corresponded to each of navigation points for which a preset voice guidance on a set route expressed by the set route data DCS should be given, and the voice navigation data DAG obtained from the voice data forming section 19 is supplied to the voice signal forming section 23.

The voice signal forming section 23 forms a voice signal SAG based on the voice navigation data DAG. Thus-formed voice signal SAG is supplied from the voice signal forming section 23 to the voice generating section 24. As a consequence, a voice output which is voice guidance based on the voice navigation data DAG formed in the voice data forming section 19 is emitted from the voice generating section 24.

The operation control section 30 has, connected thereto, an input operation section 41, a program data memory section 42 and a vibration sensor 44. The input operation section 41 is configured as having various buttons for adjustment operation, control switches and a keyboard allowing data entering therethrough, and sends out the input data DX and supplies it to the operation control section 30 by being, for example, manually operated by the user. The program data memory section 42 is configured as being preliminarily storing an operating program, and supplies program data DPR expressing the operating program to the operation control section 30 depending on needs.

The vibration sensor 44 forms vibration detecting means detecting vibration not smaller than a predetermined level, produced on the image display section 22 mounted on the body of the equipped vehicle, and sending a detection output signal SB expressing the detected vibration out therefrom. The detection output signal SB obtained from the vibration sensor 44 is supplied to the operation control section 30.

Of these input operation section 41, the program data memory section 42 and the vibration sensor 44, the program data memory section 42 may be configured as being incorporated in the operation control section 30.

The operation control section 30 is supplied with the current position data DP from the current position detecting section 13, the set route data DCS sent out from the travel route setting section 17, and the map data DM from the map data memory section 16.

The operation control section 30 creates a state of route setting operation allowing the travel route setting section 17 to set a travel route from a specific start point to a specific destination with respect to the equipped vehicle corresponding to contents of input data DX supplied from the input operation section 41, and a state of voice navigation allowing emission of voice output as voice navigation from the voice generating section 24.

When the operation control section 30 is in the state of route setting operation, the program data DPR is read out from the program data memory section 42, fetched by the operation control section 30, and under running of the operation program for route setting operation expressed by the program data DPR in the operation control section 30, the input data DX from the input operation section 41, corresponded to entering operation by the user, is fetched by the operation control section 30, as those expressing the specific destination to which the vehicle should reach, route searching conditions and so forth. In the operation control section 30, with the aid of the route setting data generating unit, the route setting data DRD is formed as such containing the destination data, search conditions data and the like based on the input data DX.

In parallel with this, the operation control section 30 supplies the operation control signal CRS to the travel route setting section 17 so as to put the travel route setting section 17 into an active state, and sends out the reference position data DZ from the reference position data generating means to the current position detecting section 13. Under such circumference, the route setting data DRD sent out from the route setting data generating means in the operation control section 30 is supplied to the travel route setting section 17.

As a consequence, a travel route from a start point as a position of the equipped vehicle expressed by the reference position data DZ to a specific destination expressed by the destination data is set in the travel route setting section 17, based on the map data DM from the map data memory section 16, the current position data DP from the current position detecting section 13, and the route setting data DRD from the operation control section 30, and thereby the set route data DCS with respect to the set travel route is formed. The set route data DCS expressing thus set new route is supplied to the display data forming section 18, the voice data forming section 19, the mark/character data forming section 20, and the operation control section 30.

The operation control section 30 in the state of voice navigation supplies the operation control signal CAG to the voice data forming section 19, and allows the voice data forming section 19 to operate so as to form the voice navigation data DAG based on the current position data DP, the set route data DCS and the map data DM. As a consequence, a voice output as the voice navigation based on the voice navigation data DAG formed in the voice data forming section 19 is emitted from the voice generating section 24.

In the navigation system shown in FIG. 1 as described in the above, an example of the information providing apparatus of the present invention is configured by portions including the mark/character data forming section 20, the image display section 22, the operation control section 30 and the vibration sensor 44.

The operation control section 30 carries out a control operation in relation to the display mode of the image display section 22, in addition to the above-described control operation. Under such control operation by the operation control section 30, the program data DPR is read out from the program data memory section 42 and fetched by the operation control section 30, and under running of the operation program for modifying the display mode expressed by the program data DPR, the detection output signal SB is first fetched when it comes from the vibration sensor 44. When the detection output signal SB from the vibration sensor 44 indicates that the image display section 22 is in a vibration-sustained state in which vibration not smaller than a predetermined level sustains over a duration of time not shorter than a predetermined duration, the operation control section 30 modifies both or either one of the adjustment-and-control signal CV from the adjustment-and-control signal generating means to be supplied to the image display section 22, and the mark/character control signal CPM from the mark/character control signal generating means to be supplied to the mark/character data forming section 20, and thereby modifies the display mode of information presented as the image display on the image display section 22 into the one making the contents of which more readily recognizable.

In a case where the adjustment-and-control signal CV supplied to the image display section 22 is desired to be modified, the operation control section 30 defines the adjustment-and-control signal CV formed by the adjustment-and-control signal generating means as the one increasing the luminance of the display screen of the image display section 22, as compared with the case where the image display section 22 is not in the vibration-sustained state (referred to as "luminance-increasing, adjustment-and-control signal CV", hereinafter).

In a case where the mark/character control signal CPM supplied to the mark/character data forming section 20 is desired to be modified, the operation control section 30 defines the mark/character control signal CPM formed by the mark/character control signal generating means as the one producing the mark/character data DMM which enlarges size of the individual images of characters indicating, for example, names of various buildings, facilities and so forth, and names of places which appear along the individual roads on the road map within a travel range of the equipped vehicle expressed by the map data DM, and of the own vehicle position mark indicating a current position of the equipped vehicle expressed by the current position data DP as viewed on the display screen in the image display section 22 (referred to as "mark/character-enlarging, mark/character control signal CPM", hereinafter), as compared with the case where the image display section 22 is not in the vibration-sustained state; as the one producing the mark/character data DMM which increases difference in contrast between an image of high importance and an image of low importance (referred to as "contrast-difference-increasing, mark/character control signal CPM", hereinafter), assuming that, for example on the display screen in the image display section 22, high contrast is owned by a portion along a set route expressed by the set route data DCS on the road map within the travel range of the equipped vehicle expressed by the map data DM, that low contrast is owned by a portion apart from the high contrast portion, and that an intermediate contrast is owned by a portion falls therebetween; and as the one functioning as the both of the mark/character-enlarging, mark/character control signal CPM and the contrast-difference-increasing, mark/character control signal CPM (referred to as "mark/character-enlarging, and contrast-difference-increasing, mark/character control signal", hereinafter).

For a case where the adjustment-and-control signal CV supplied from the adjustment-and-control signal generating means in the operation control section 30 to the image display section 22 is given as the luminance-increasing, adjustment-and-control signal CV, more bright and clear display is given on the display screen in the image display section 22 for all of the road map image A expressing the road map shown in FIG. 2, the image B of own vehicle position mark superposed thereon, expressing a current position of the equipped vehicle, the image C expressing a set route, and images of characters indicating names given to various buildings, facilities and so forth, and names of places which appear along the individual roads shown in the map image A. It is therefore understood that the image B of own vehicle position mark, the image C expressing the set route, and images of characters indicating names given to various buildings, facilities and so forth, and names of places which appear along the individual roads shown in the map image A, all of which are necessary for assisting travel of the equipped vehicle, can clearly be recognized, even when the image display section 22 is placed under a vibration-sustained state in which vibration not smaller than a predetermined level sustains over a duration of time not shorter than a predetermined duration.

Figure 3:
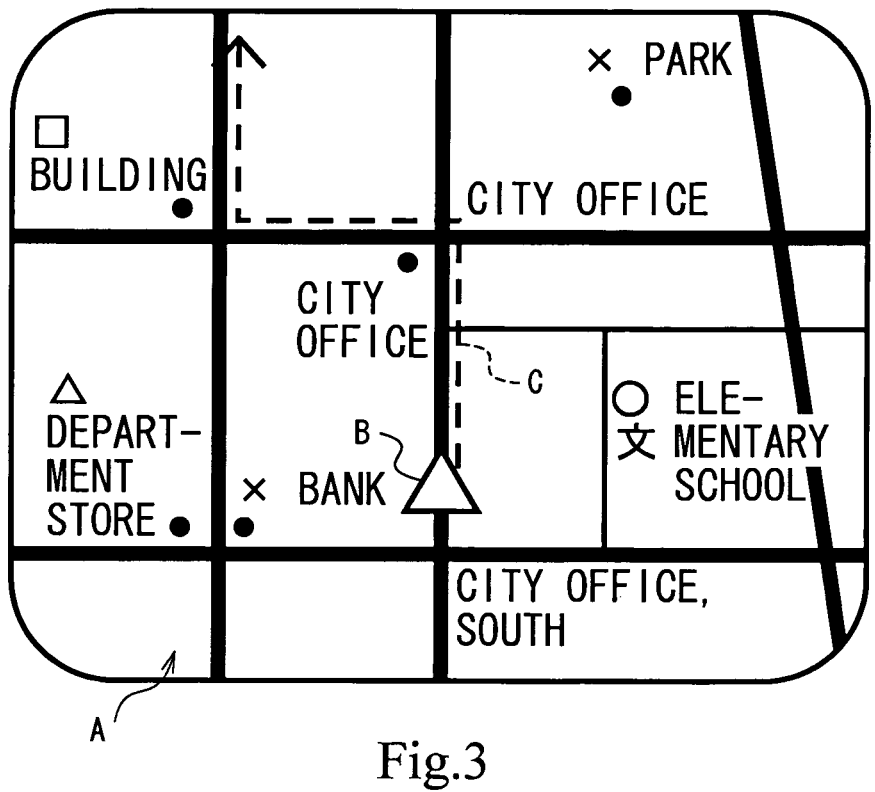
FIG. 3 is a conceptual drawing presented for explaining a display mode in the image display section used in the example shown in FIG. 1.

For another case where the mark/character control signal CPM supplied from the mark/character control signal generating means in the operation control section 30 to the mark/ character data forming section 20 is given as the mark/character-enlarging, mark/character control signal CPM, as shown in FIG. 3, only the image B of own vehicle position mark, and images of characters indicating names given to various buildings, facilities and so forth, and names of places which appear along the individual roads shown in the map image A, out of the road map image A, the image B of own vehicle position mark overlaid thereon, expressing a current position of the equipped vehicle, the image C of a set route, and images of characters indicating names given to various buildings, facilities and so forth, and names of places which appear along the individual roads shown in the map image A, are displayed in an enlarged manner, on the screen of the image display section 22 on which images based on the image display data DSP from the display data forming section 18 to which the mark/character data DMM from the mark/character data forming section 20 is supplied. It is therefore understood that the image B of own vehicle position mark, images of characters indicating names given to various buildings, facilities and so forth, and names of places which appear along the individual roads shown in the map image A, all of which are particularly necessary for assisting travel of the equipped vehicle, can clearly be recognized, even when the image display section 22 is placed under the vibration-sustained state in which vibration not smaller than a predetermined level sustains over a duration of time not shorter than a predetermined duration.

Figure 4:
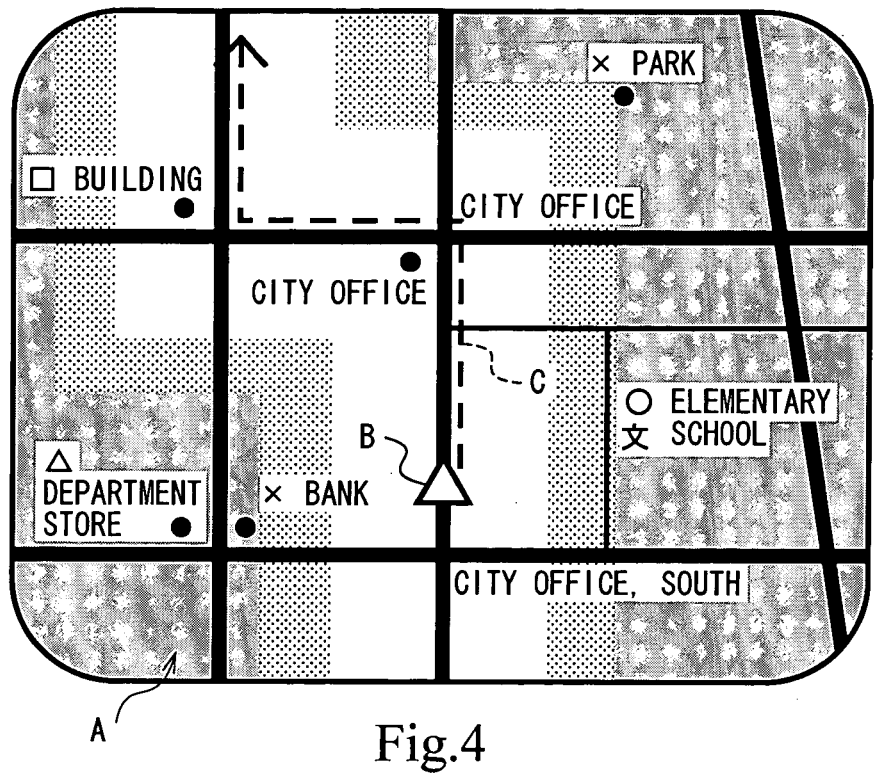
FIG. 4 is a conceptual drawing presented for explaining a display mode in the image display section used in the example shown in FIG. 1.

For another case where the mark/character control signal CPM supplied from the mark/character control signal generating means in the operation control section 30 to the mark/character data forming section 20 is given as the contrast-difference-increasing, mark/character control signal CPM, as shown in FIG. 4, a portion along the image C expressing a set route is displayed with a high contrast, a portion apart from the image C expressing the set route is displayed with a low contrast, and a portion falls between the portion along the image C expressing the set route and the portion apart from the image C expressing the set route is displayed with an intermediate contrast, on the screen of the image display section 22 on which images based on the image display data DSP from the display data forming section 18 to which the mark/character data DMM from the mark/character data forming section 20 is supplied. In other words, on the screen in the image display section 22, difference in the contrast between the image corresponded to information of high importance and the image corresponded to information of low importance increases. It is therefore understood that the image B of own vehicle position mark, the image C expressing the set route, and images of characters indicating names given to various buildings, facilities and so forth, and names of places which appear along the set route, all of which are particularly necessary for assisting travel of the equipped vehicle, can clearly be recognized, even when the image display section 22 is placed under the vibration-sustained state in which vibration not smaller than a predetermined level sustains over a duration of time not shorter than a predetermined duration.

Figure 5:
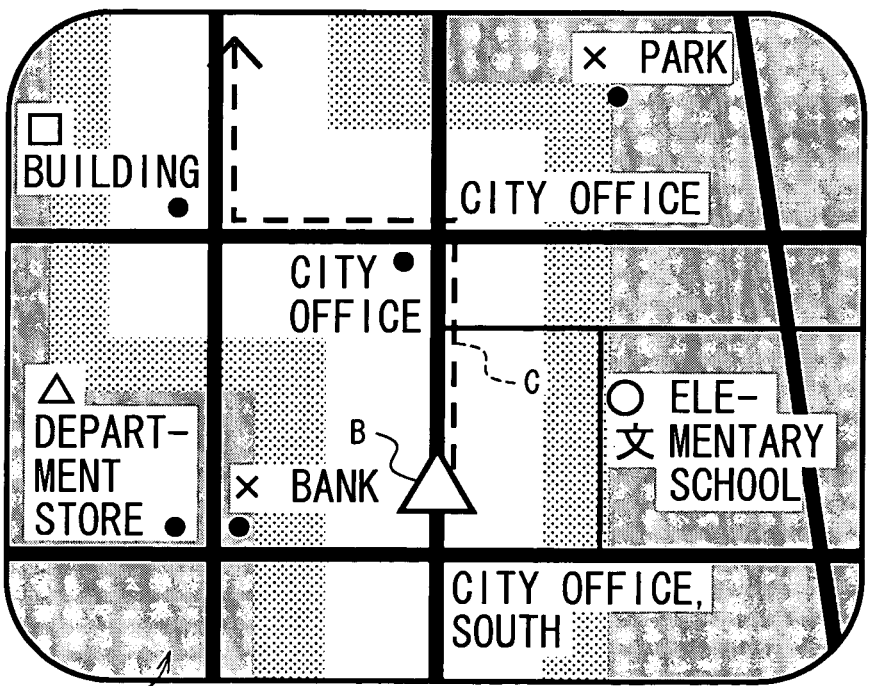
FIG. 5 is a conceptual drawing presented for explaining a display mode in the image display section used in the example shown in FIG. 1.

For still another case where the mark/character control signal CPM supplied from the mark/character control signal generating means in the operation control section 30 to the mark/character data forming section 20 is given as the mark/character-enlarging, and contrast-difference-increasing, mark/character control signal CPM, as shown in FIG. 5, only the image B of own vehicle position mark, and images of characters indicating names given to various buildings, facilities and so forth, and names of places which appear along the individual roads shown in the map image A, out of the road map image A, the image B of own vehicle position mark superposed thereon, expressing a current position of the equipped vehicle, the image C of a set route, and images of characters indicating names given to various buildings, facilities and so forth, and names of places which appear along the individual roads shown in the map image A, are displayed in an enlarged manner, and a portion along the image C expressing a set route is displayed with a high contrast, a portion apart from the image C expressing the set route is displayed with a low contrast, and a portion falls between the portion along the image C expressing the set route and the portion apart from the image C expressing the set route is displayed with an intermediate contrast, on the screen of the image display section 22 on which images based on the image display data DSP from the display data forming section 18 to which the mark/character data DMM from the mark/character data forming section 20 is supplied. It is therefore understood that the image B of own vehicle position mark, and images of characters indicating names given to various buildings, facilities and so forth, and names of places which appear along the set route, all of which are particularly necessary for assisting travel of the equipped vehicle, can clearly be recognized, while making, out of them, the image B of own vehicle position mark, the image C expressing the set route, and images of characters indicating names given to various buildings, facilities and so forth, and names of places which appear along the set route particularly remarkable, even when the image display section 22 is placed under the vibration-sustained state in which vibration not smaller than a predetermined level sustains over a duration of time not shorter than a predetermined duration.

For a case where both of the adjustment-and-control signal CV supplied from the adjustment-and-control signal generating means in the operation control section 30 to the image display section 22, and the mark/character control signal CPM supplied from the mark/character control signal generating means of the operation control section 30 to the mark/character data forming section 20 are modified, the adjustment-and-control signal CV is given as the luminance-increasing, adjustment-and-control signal CV, and the mark/character control signal CPM is given as the mark/character-enlarging, contrast-difference-increasing, or mark/character-enlarging and contrast-difference increasing, mark/character control signal CPM. In this case, it is understood that any combinations of the adjustment-and-control signal CV and the mark/character control signal CPM allow clear recognition of the image B of own vehicle position mark, the image C expressing the set route, and images of characters indicating names given to various buildings, facilities and so forth, and names of places which appear along the set route shown in the road map image A, all of which are particularly necessary for assisting travel of the equipped vehicle, on the screen in the image display section 22, as described in the above, when the image display section 22 is placed under the vibration-sustained state in which vibration sustains over a duration of time not shorter than a predetermined duration.

When the detection output signal SB from the vibration sensor 44 has come to a state not showing that the image display section 22 is in the vibration-sustained state in which vibration not smaller than a predetermined level sustains over a duration of time not shorter than a predetermined duration, the operation control section 30 recovers the original state of both of, or either one of, the adjustment-and-control signal CV and the mark/character control signal CPM, once modified as described in the above, making it a provision that a state, such that the detection output signal SB does not indicate occurrence of vibration of not smaller than a predetermined level in the image display section 22, sustained over a predetermined duration of time.

Figure 6:
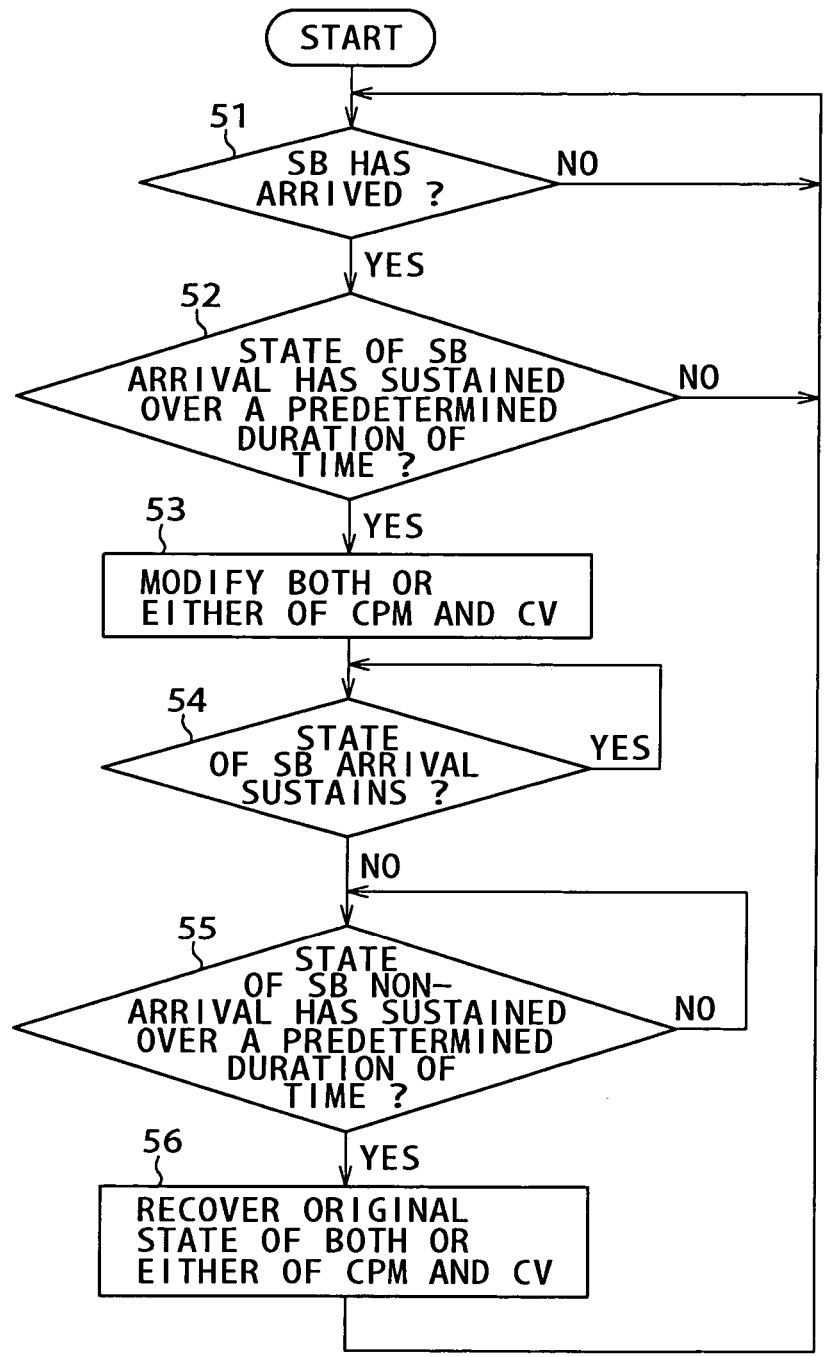
FIG. 6 is a flow chart showing an exemplary operation program executed, by a microcomputer composing an operation control section in the example shown in FIG. 1, in order to effect a control operation for modifying a display mode for the image display section.

The operation control section 30 shown in FIG. 1, allowing control operation as described in the above, is typically configured using a microcomputer. FIG. 6 is a flow chart showing an exemplary operation program executed by a microcomputer constituting the operation control section 30, in order to execute a control operation for modifying a display mode for the image display section 22.

According to the flow chart shown in FIG. 6, following the start in Step 51, whether the detection output signal SB from the vibration sensor 44 has arrived or not is judged, and the judgment is repeated if the detection output signal SB has not arrived.

As a result of the judgment in Step 51, if it is judged that the detection output signal SB from the vibration sensor 44 has been arrived, whether the state of arrival of the detection output signal SB has sustained over a predetermined period of time or not is judged in Step 52. In a case where the state of arrival of the detection output signal SB has not sustained over a predetermined period of time, the process returns to Step 51.

In a case where the judgment in Step 52 revealed that the state of arrival of the detection output signal SB has sustained over a predetermined period of time, then in Step 53, both of, or either one of, the adjustment-and-control signal CV from the adjustment-and-control signal generating means, to be supplied to the image display section 22, and the mark/character control signal CPM from the mark/character control signal generating means, to be supplied to the mark/character data forming section 20, are modified. The resultant states include a state having the adjustment-and-control signal CV typically given as the luminance-increasing, adjustment-and-control signal CV; a state having the mark/character control signal CPM typically given as the mark/character-enlarging, contrast-difference-increasing, or mark/character-enlarging and contrast-difference-increasing mark/character control signal CPM; and a state having the adjustment-and-control signal CV typically given as luminance-increasing, adjustment-and-control signal CV, and the mark/character control signal CPM typically given as the mark/character-enlarging, contrast-difference-increasing, or mark/character-enlarging and contrast-difference-increasing, mark/character control signal CPM.

Next in Step 54, whether the state of arrival of the detection output signal SB from the vibration sensor 44 has sustained or not is judged. The judgment in Step 54 is repeated if the state of arrival of the detection output signal SB has sustained, and the process advances to Step 55 if the state of arrival of the detection output signal SB has no more sustained.

In Step 55, whether the state of non-arrival of the detection output signal SB has sustained over a predetermined period of time is judged. The judgment in Step 55 is repeated, in a case where the state of non-arrival of the detection output signal SB has not sustained over a predetermined period of time.

If the judgment in Step 55 revealed that the state of non-arrival of the detection output signal SB has sustained over a predetermined period of time, then in Step 56, both of, or either one of, the adjustment-and-control signal CV from the adjustment-and-control signal generating means, to be supplied to the image display section 22, and the mark/character control signal CPM from the mark/character control signal generating means, to be supplied to the mark/character data forming section 20 are recovered typically from a state having the adjustment-and-control signal CV given as the luminance-increasing, adjustment-and-control signal CV; a state having the mark/character control signal CPM given as the mark/character-enlarging, contrast-difference-increasing, or mark/character-enlarging and contrast-difference-increasing, mark/character control signal CPM; or a state having the adjustment-and-control signal CV given as the luminance-increasing, adjustment-and-control signal CV, and the mark/character control signal CPM given as the mark/character-enlarging, contrast-difference-increasing, or mark/character-enlarging and contrast-difference-increasing mark/character control signal CPM, and the process goes back to Step 51.

INDUSTRIAL APPLICABILITY

The information providing apparatus of the present invention as described in the above can widely be used as that applicable to navigation systems mounted on various mobile objects, including various vehicles driving on road, and various marine vessels sailing on the sea or the like.

What is claimed is:
1. An information providing apparatus comprising:
   image display means for mounting on a mobile object, presenting an image display comprising mark and character information, said mark and character information comprising a first subset of greater importance in assisting travel of the mobile object and a second subset of lesser importance in assisting travel of the mobile object, the first subset comprising at least one of an indication of a location of the mobile object and an indication of a travel route of the mobile object;
   vibration detecting means for detecting vibration produced on said image display means, determining whether the detected vibration is not smaller than a static, predetermined level defined prior to said vibration being detected, and sending a detection output signal when said vibration is determined to be not smaller than said predetermined level, said predetermined level being greater than an absence of vibration; and
   operation control means for:
      modifying a display mode of said first subset of information presented in the image display by said image display means from a first display mode to a second display mode, and not changing a display mode of said second subset of information, so as to increase a contrast between the first subset of information and the second subset of information on the image display, if receipt of said detection output signal over a predetermined duration of positive length indicates that the vibration of not smaller than said predetermined level produced on said image display means sustains over the predetermined duration; and
      modifying the display mode of said first subset of information presented in the image display by said image display means from the second display mode to the first display mode when an absence of output of said detection output signal is detected over a predetermined duration of positive length.

2. The information providing apparatus as claimed in claim 1, wherein said operation control means takes part in a control of increasing luminance of said first subset of information on a display screen on which said mark and character information is presented in the image display in said image display means, if the detection output signal is received from said vibration detecting means over the predetermined duration.

3. The information providing apparatus as claimed in claim 1, wherein said operation control means takes part in a control of enlarging said first subset of information presented in the image display by said image display means, if the detection output signal is received from said vibration detecting means over the predetermined duration.

4. The information providing apparatus as claimed in claim 1, wherein:
said mobile object is a vehicle, and
said image display means is configured so as to present image display of a road map image having a current position of said vehicle and an image expressing a travel route superposed therein, as said information.

5. A method of providing an image display comprising mark and character information on an image display section of an information providing apparatus mounted on said mobile object, said mark and character information comprising a first subset of greater importance in assisting travel of the mobile object and a second subset of lesser importance in assisting travel of the mobile object, the first subset comprising at least one of an indication of a location of the mobile object and an indication of a travel route of the mobile object, the method comprising:
defining a static, predetermined vibration level that is greater than an absence of vibration;
subsequent to the defining, detecting vibration produced on said image display section;
determining whether said detected vibration is not smaller than the predetermined vibration level;
sending a detection output signal when said vibration is not smaller than said predetermined vibration level;
modifying a display mode of said first subset of information presented as an image display by said image display section from a first display mode to a second display mode, and not changing a display mode of said second subset of information, so as to increase a contrast between the first subset of information and the second subset of information on the image display, if receipt of said detection output signal over a predetermined duration of positive length indicates that the vibration of not smaller than said predetermined vibration level produced on said image display section sustains over the predetermined duration; and
modifying the display mode of said first subset of information presented as an image display by said image display section from the second display mode to the first display mode when an absence of output of said detection output signal is determined over a predetermined duration of positive length.

6. The information providing method as claimed in claim 5, wherein modifying the display mode from the first display mode to the second display mode comprises increasing luminance of said first subset of information on a display screen on which said mark and character information is presented in the image display in said image display means.

7. The information providing method as claimed in claim 5, wherein modifying the display mode from the first display mode to the second display mode comprises enlarging said first subset of information presented in the image display by said image display means.

8. The information providing method as claimed in claim 5, wherein:
said mobile object is a vehicle, and
said image display means is configured so as to present image display of a road map image having a current position of said vehicle and an image expressing a travel route superposed therein, as said information.

9. An information providing apparatus comprising:
an image display section mounted on a mobile object, presenting an image display comprising mark and character information, said mark and character information comprising a first subset of greater importance in assisting travel of the mobile object and a second subset of lesser importance in assisting travel of the mobile object, the first subset comprising at least one of an indication of a location of the mobile object and an indication of a travel route of the mobile object;
a vibration detecting section operable to detect vibration produced on said image display section, determine whether a detected vibration is not smaller than a static, predetermined level defined prior to said vibration being detected, and send a detection output signal when said vibration is determined to be not smaller than said predetermined level, said predetermined level being greater than an absence of vibration; and
an operation control section operable to:
modify a display mode of said first subset of information presented in the image display by said image display section from a first display mode to a second display mode, and not changing a display mode of said second subset of information, so as to increase a contrast between the first subset of information and the second subset of information on the image display, if receipt of said detection output signal over a predetermined duration of positive length indicates that the vibration of not smaller than said predetermined level produced on said image display section sustains over the predetermined duration; and
modify the display mode of said first subset of information presented in the image display by said image display section from the second display mode to the first display mode when an absence of output of said detection output signal is detected over a predetermined duration of positive length.

10. The information providing apparatus of claim 9, wherein said operation control section is operable to take part in a control of increasing luminance of said first subset of information on a display screen on which said mark and character information is presented in the image display in said image display section, if the detection output signal is received from said vibration detecting section over the predetermined duration.

11. The information providing apparatus as claimed in claim 9, wherein said operation control section is operable to take part in a control of enlarging said first subset of information presented in the image display by said image display section, if the detection output signal is received from said vibration detecting section over the predetermined duration.

12. The information providing apparatus as claimed in claim 9, wherein:
said mobile object is a vehicle, and
said image display section is configured so as to present image display of a road map image having a current position of said vehicle and an image expressing a travel route superposed therein, as said information.

13. At least one computer-readable storage device having stored thereon instructions which, when executed, perform a method of providing an image display comprising mark and character information on an image display section of an information providing apparatus mounted on said mobile object, said mark and character information comprising a first subset of greater importance in assisting travel of the mobile object and a second subset of lesser importance in assisting travel of the mobile object, the first subset comprising at least one of an indication of a location of the mobile object and an indication of a travel route of the mobile object, the method comprising:
defining a static, predetermined vibration level that is greater than an absence of vibration;

subsequent to the defining, detecting vibration of information presented said image display section;
determining whether said detected vibration is not smaller than the predetermined vibration level;
sending a detection output signal when said vibration is not smaller than said predetermined vibration level;
modifying a display mode of said first subset of information presented as an image display by said image display section from a first display mode to a second display mode, and not changing a display mode of said second subset of information, so as to increase a contrast between the first subset of information and the second subset of information on the image display, if receipt of said detection output signal over a predetermined duration of positive length indicates that the vibration of not smaller than said predetermined vibration level produced on said image display section sustains over the predetermined duration; and
modifying the display mode of said first subset of information presented as an image display by said image display section from the second display mode to the first display mode when an absence of output of said detection output signal is determined over a predetermined duration of positive length.

* * * * *